US008275677B2

(12) United States Patent
Armstrong et al.

(10) Patent No.: US 8,275,677 B2
(45) Date of Patent: *Sep. 25, 2012

(54) RESOLVING DEMAND AND SUPPLY IMBALANCES

(75) Inventors: Edward W. Armstrong, Chapel Hill, NC (US); Brian T. Eck, Poughkeepsie, NY (US); Mark A. Henderson, Hopewell Junction, NY (US); Daniel J. Peters, Somers, NY (US); Howard K. Porter, Research Triangle Park, NC (US); Linda L. Scheib, Austin, TX (US); Elizabeth C. Szymanowicz, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 481 days.

This patent is subject to a terminal disclaimer.

(21) Appl. No.: 12/544,337

(22) Filed: Aug. 20, 2009

(65) Prior Publication Data
US 2009/0313090 A1    Dec. 17, 2009

Related U.S. Application Data

(62) Division of application No. 10/660,950, filed on Sep. 11, 2003, now Pat. No. 7,500,178.

(51) Int. Cl.
*A01K 5/02* (2006.01)
(52) U.S. Cl. .................. 705/29; 705/26.1; 705/27.1
(58) Field of Classification Search .............. 705/19, 705/28, 31
See application file for complete search history.

(56) References Cited

U.S. PATENT DOCUMENTS

| 4,114,601 | A | * | 9/1978 | Abels ........................ 600/20 |
| 4,788,643 | A |   | 11/1988 | Trippe et al. |
| 5,111,391 | A |   | 5/1992 | Fields et al. |
| 5,128,861 | A |   | 7/1992 | Kagami et al. |
| 5,190,059 | A | * | 3/1993 | Fabian et al. ............ 128/899 |
| 5,287,267 | A |   | 2/1994 | Jayaraman et al. |
| 5,548,518 | A |   | 8/1996 | Dietrich et al. |
| 5,630,070 | A |   | 5/1997 | Dietrich et al. |
| 5,903,876 | A | * | 5/1999 | Hagemier .................. 705/19 |
| 5,931,824 | A | * | 8/1999 | Stewart et al. ........... 604/358 |

(Continued)

OTHER PUBLICATIONS

Cohen, M. and H.L. Lee, "Out of Touch with Customer Needs? Spare Parts and After Sales Service", 1990, Sloan Management Review, Winter, pp. 55-56.*

(Continued)

*Primary Examiner* — Scott Zare
*Assistant Examiner* — Talia Crawley
(74) *Attorney, Agent, or Firm* — Cantor Colburn LLP; Louis Percello (57) ABSTRACT

A storage medium for resolving demand and supply imbalances is provided. The storage medium includes machine-readable computer program code and instructions for causing a computer to implement a method. The method includes identifying an excess component inventory liability or constraint in supply capability for an end product by matching current buying patterns for the end product against inventory liability and supply capability based on a previous demand forecast. Where excess component inventory liability exists, the method includes: refocusing the excess component inventory liability by determining alternative end products that use components identified in the excess component inventory liability; and executing sales activities for enticing sales of the alternative end products. Where constrained supply capability exists, the method includes determining alternative end products that are functionally equivalent to those in the constrained supply capability, and executing sales activities for enticing sales of functionally equivalent alternative end products.

11 Claims, 5 Drawing Sheets

U.S. PATENT DOCUMENTS

| | | | |
|---|---|---|---|
| 5,943,484 A | 8/1999 | Milne et al. | |
| 5,946,662 A | 8/1999 | Ettl et al. | |
| 5,953,707 A * | 9/1999 | Huang et al. | 705/10 |
| 5,960,414 A | 9/1999 | Rand et al. | |
| 5,970,465 A | 10/1999 | Dietrich et al. | |
| 6,003,016 A * | 12/1999 | Hagemier | 705/19 |
| 6,006,016 A | 12/1999 | Faigon et al. | |
| 6,032,123 A | 2/2000 | Jameson | |
| 6,041,267 A | 3/2000 | Dangat et al. | |
| 6,076,007 A * | 6/2000 | England et al. | 600/424 |
| 6,078,899 A * | 6/2000 | Francisco et al. | 705/19 |
| 6,167,380 A | 12/2000 | Kennedy et al. | |
| 6,188,989 B1 | 2/2001 | Kennedy | |
| 6,226,561 B1 | 5/2001 | Tamaki et al. | |
| 6,366,206 B1 * | 4/2002 | Ishikawa et al. | 340/573.1 |
| 6,397,118 B1 | 5/2002 | Gleditsch et al. | |
| 6,400,272 B1 * | 6/2002 | Holtzman et al. | 340/572.1 |
| 6,424,262 B2 * | 7/2002 | Garber et al. | 340/572.3 |
| 6,438,528 B1 * | 8/2002 | Jensen et al. | 705/44 |
| 6,463,345 B1 | 10/2002 | Peachey-Kountz et al. | |
| 6,493,724 B1 | 12/2002 | Cusack et al. | |
| 6,546,373 B1 * | 4/2003 | Cerra | 705/19 |
| 6,600,418 B2 * | 7/2003 | Francis et al. | 340/572.1 |
| 6,604,089 B1 | 8/2003 | Van Horn et al. | |
| 6,606,744 B1 | 8/2003 | Mikurak | |
| 6,640,214 B1 * | 10/2003 | Nambudiri et al. | 705/26 |
| 6,669,089 B2 * | 12/2003 | Cybulski et al. | 235/385 |
| 6,763,104 B1 | 7/2004 | Judkins et al. | |
| 6,768,419 B2 * | 7/2004 | Karel et al. | 340/572.4 |
| 6,786,419 B2 | 9/2004 | Kayanakis | |
| 6,809,645 B1 * | 10/2004 | Mason | 340/572.1 |
| 6,861,954 B2 * | 3/2005 | Levin | 340/539.12 |
| 6,900,731 B2 * | 5/2005 | Kreiner et al. | 705/28 |
| 7,010,507 B1 * | 3/2006 | Anderson et al. | 705/35 |
| 7,019,650 B2 * | 3/2006 | Volpi et al. | 340/520 |
| 7,058,587 B1 | 6/2006 | Horne | |
| 7,130,807 B1 | 10/2006 | Mikurak | |
| 7,130,812 B1 | 10/2006 | Iyer et al. | |
| 7,142,118 B2 * | 11/2006 | Hamilton et al. | 209/3.3 |
| 7,155,402 B1 * | 12/2006 | Dvorak | 705/28 |
| 7,162,503 B2 | 1/2007 | Oeda | |
| 7,177,829 B1 * | 2/2007 | Wilson et al. | 705/30 |
| 7,231,361 B2 | 6/2007 | Eck et al. | |
| 7,289,968 B2 | 10/2007 | Ferreri et al. | |
| 7,307,530 B2 * | 12/2007 | Fabian et al. | 340/572.1 |
| 7,557,710 B2 * | 7/2009 | Sanchez et al. | 700/215 |
| 2001/0051901 A1 | 12/2001 | Hager et al. | |
| 2002/0002448 A1 | 1/2002 | Kampe | |
| 2002/0013731 A1 | 1/2002 | Bright et al. | |
| 2002/0039722 A1 | 4/2002 | Lippman | |
| 2002/0042756 A1 | 4/2002 | Kumar et al. | |
| 2002/0067263 A1 * | 6/2002 | Tafoya et al. | 340/572.1 |
| 2002/0069121 A1 | 6/2002 | Jain et al. | |
| 2002/0077800 A1 | 6/2002 | Kampe | |
| 2002/0077937 A1 | 6/2002 | Lyons et al. | |
| 2002/0107763 A1 | 8/2002 | Palmer et al. | |
| 2002/0111880 A1 | 8/2002 | Stutts et al. | |
| 2002/0128922 A1 | 9/2002 | Joao | |
| 2002/0131565 A1 | 9/2002 | Scheuring et al. | |
| 2002/0143320 A1 * | 10/2002 | Levin | 606/1 |
| 2002/0147651 A1 | 10/2002 | Hoar et al. | |
| 2002/0152133 A1 | 10/2002 | King et al. | |
| 2002/0169681 A1 | 11/2002 | Vincent et al. | |
| 2002/0174000 A1 | 11/2002 | Katz et al. | |
| 2002/0188499 A1 | 12/2002 | Jenkins et al. | |
| 2003/0018546 A1 * | 1/2003 | Ayala et al. | 705/28 |
| 2003/0066537 A1 * | 4/2003 | Fabian et al. | 128/899 |
| 2003/0074349 A1 | 4/2003 | Gupta et al. | |
| 2003/0074377 A1 | 4/2003 | Gupta et al. | |
| 2003/0088450 A1 * | 5/2003 | Chiu et al. | 705/8 |
| 2003/0088472 A1 | 5/2003 | Offutt et al. | |
| 2003/0105394 A1 * | 6/2003 | Fabian et al. | 600/407 |
| 2003/0110104 A1 | 6/2003 | King et al. | |
| 2003/0134628 A1 | 7/2003 | Litwin | |
| 2003/0163399 A1 | 8/2003 | Harper et al. | |
| 2003/0167222 A1 | 9/2003 | Mehrotra et al. | |
| 2003/0172007 A1 | 9/2003 | Helmolt et al. | |
| 2003/0204455 A1 | 10/2003 | Eck et al. | |
| 2003/0216969 A1 | 11/2003 | Bauer et al. | |
| 2004/0019494 A1 | 1/2004 | Ridgeway et al. | |
| 2004/0024628 A1 | 2/2004 | Eck et al. | |
| 2004/0049905 A1 | 3/2004 | Jansch et al. | |
| 2004/0064351 A1 | 4/2004 | Mikurak | |
| 2004/0073490 A1 | 4/2004 | Shah et al. | |
| 2004/0084525 A1 * | 5/2004 | Kreiner et al. | 235/384 |
| 2004/0098403 A1 | 5/2004 | Gupta et al. | |
| 2004/0129279 A1 * | 7/2004 | Fabian et al. | 128/899 |
| 2004/0186784 A1 | 9/2004 | Felicio et al. | |
| 2004/0201479 A1 * | 10/2004 | Garber et al. | 340/572.1 |
| 2004/0236641 A1 | 11/2004 | Abbott et al. | |
| 2004/0250819 A1 * | 12/2004 | Blair et al. | 128/899 |
| 2004/0254825 A1 | 12/2004 | Hsu et al. | |
| 2004/0260601 A1 | 12/2004 | Brief | |
| 2005/0060242 A1 | 3/2005 | Armstrong et al. | |
| 2006/0041660 A1 | 2/2006 | Bishop et al. | |
| 2006/0085450 A1 | 4/2006 | Seubert et al. | |
| 2007/0061185 A1 | 3/2007 | Peters et al. | |
| 2007/0083442 A1 | 4/2007 | Peters et al. | |
| 2007/0088626 A1 | 4/2007 | Lee et al. | |
| 2007/0093709 A1 * | 4/2007 | Abernathie | 600/407 |
| 2007/0290030 A1 * | 12/2007 | Fox et al. | 705/23 |

OTHER PUBLICATIONS

Ahmet Bulut, A Flexible Data Mining Architecture for Monitoring Data Streams, University of California, Jun. 2005.*

Kevin O'Marah, Best Practices for Collaborative Forecasting, AMR Research Report, Mar. 2002.

Robert J. Bowman, Click-andMortar Retailers Prevail While Dotcoms Fade, Global Logistics & Supply Chain Strategies, Dec. 2001, pp. 32-37.

Internet World Magazine, [online]; [retrieved on Aug. 10, 2009]; retrieved from the Internet http://journals.iranscience.net:800/www.internetworld.com/www.internetworld.com/magazine.php@inc=010103__2F01.01.03facing.html John Pallattoo, Data Tools Expose Sales Opportunities, Internet World, Jan. 2003, pp. 12-13.

Kurt C. Hoffman, Dunlop Stops "Pushing" Tires at Plant in South Africa, Global Logistics & Supply Chain Strategies, Oct. 2001, pp. 42-50.

Frank Wattenberg, Dynamic Systems, Continuous and Discrete Models, Montana State University, Bozeman, Montana, 1997.

Arnold Kling, Efficiency, Supply and Demand, and Market Clearing, Aug. 2002.

Jean V. Murphy, Forecasting Tool Lowers Coke Bottler's Inventory, Global Logistics & Supply Chain Strategies, Nov. 2002, pp. 41-44.

Afriat, Sydney, Market Equilibrium and Stability, Quaderini, Siena University, Italy, Sep. 1999.

Aberdeen Group, Optimizing Demand Chain Processes for High-Tech Manufacturing—an e-Business Roadmap for 2002 and Beyond, Intershop Communication, Inc., 2002.

Stacie McCullough-Kilgore, Planning Applications Balance Inventory Supply and Demand, Supply Chain e-Business, Jul./Aug. 2002, pp. 22-24.

Mary Haigis, Sell-Side Solutions and the Customer-Centric Enterprise, Supply Chain e-Business, Jul./Aug. 2002, pp. 50-52.

David Pursell, Supply and Demand: The Only Characters That Matter!, Simmons & Company International, Houston, Texas, Sep. 1998.

Mark Pingle and Leigh Tesfatsion, Walras' Law in Overlapping Generations Economies, University of Nevada, Reno, Oct. 1997.

Kurt C. Hoffman, Who's That Behind FosterGrant's Demand Planning?, Global Logistics & Supply Chain Strategies, Jun. 2002, pp. 42-47.

M. Cohen and H. Lee, Out of Touch With Customer Needs? Spare Parts and After Sales Service, Sloan Management Review, Winter 1990, pp. 55-56.

Internet World Magazine, [online]; [retreived on Aug. 10, 2009]; retrieved fom the Internet http://journals.iranscience.net:800/www.internetworld.com/www.internetworld.com/magazine.php@inc=010103__2F01.01.03facing.html John Pallattoo, Data Tools Expose Sales Opportunities, Internet World, Jan. 2003, pp. 12-13.

* cited by examiner

RESOLVING DEMAND AND SUPPLY IMBALANCES

CROSS-REFERENCE TO RELATED APPLICATIONS

This application is a divisional of U.S. patent application Ser. No. 10/660,850, filed Sep. 12, 2003, the disclosure of which is incorporated by reference herein in its entirety.

BACKGROUND

The present invention relates generally to integrated supply chain, sales and marketing, and more particularly, to resolving demand and supply imbalances.

Effective supply chain management is becoming increasingly important to manufacturing enterprises, particularly with respect to commoditized products. In today's global economy, life cycles and prices related to commodities have dramatically declined over the last ten years. Further, the growth of e-commerce on the Internet creates additional pressures on this type of industry as traditional geographic barriers are broken down and new businesses/competitors are entering the market. To stay competitive, these market dynamics require commoditized businesses as well as other industries to develop and introduce new products faster and cheaper than the competition. To meet this challenge, new and enhanced business solutions are critical.

Business processes, associated criteria, and applicable tools are used to optimally condition demand based on current supply positions. Many factors can contribute to demand and supply imbalances, such as an increase in unforecasted demands, higher than expected supply capability, shifts in technology, customer wants and needs, or poorly selected price points. Advertising campaigns and improved sales forecasting are used in an effort to rectify such imbalances. However, advertising has been known to be ineffective or even backfire. Forecast accuracy is a perennial problem. It is also common for companies to rebalance demand and supply through pricing actions alone. From a macroeconomics perspective this may seem prudent. However, pricing actions fail to address the many factors that address the imbalance in demand and supply. The outcomes of unresolved demand and supply imbalances include lost revenue, high inventory, and decreased customer satisfaction.

What is needed, therefore, is a way to provide integrated demand planning, sales forecasting, inventory liability reduction, replenishment, process reengineering, sales operations, and other business processes related to integrated supply chain, sales and marketing management activities.

SUMMARY

An exemplary embodiment of the invention relates to a storage medium for resolving demand and supply imbalances. The storage medium includes machine-readable computer program code and instructions for causing a computer to implement a method. The method includes identifying an excess component inventory liability or constraint in supply capability for an end product by matching current buying patterns for the end product against inventory liability and supply capability based on a previous demand forecast. Where excess component inventory liability exists, the method includes: refocusing the excess component inventory liability by determining alternative end products that use components identified in the excess component inventory liability; and executing sales activities for enticing sales of the alternative end products. Where constrained supply capability exists, the method includes determining alternative end products that are functionally equivalent to those in the constrained supply capability, and executing sales activities for enticing sales of functionally equivalent alternative end products.

BRIEF DESCRIPTION OF THE SEVERAL VIEWS OF THE DRAWINGS

Referring now to the drawings wherein like elements are numbered alike in the several FIGURES.

DETAILED DESCRIPTION

The demand conditioning system creates and integrates independent business sub-processes into a coherent demand conditioning business process that systematically addresses imbalances between demand and current supply position. The demand conditioning system integrates customers' wants and needs, supplier capabilities, and internal planning efforts to effectively balance supply and demand, grow revenue, increase customer satisfaction, enhance profitability, and minimize inventory liability. The demand conditioning system is an interdisciplinary, proactive process based on product performance, pricing, availability, and data mining. The business process may be used for all market segments and all routes to market, including face-to-face, inbound and outbound telephones sales (TeleSales), business partners and distributors, and Internet sales operations. Sales and marketing techniques may vary by market, channel, and business conditions, but the process is sufficiently robust to handle dynamic business and environmental factors. Near real-time demand and supply data, business rules and process synchronization are prescribed for the demand conditioning system. The demand conditioning system process is portable across business models, business units and products sold.

The demand conditioning system is performed using a three-phase approach: plan, develop, and execute. The demand conditioning system process evaluates periodic (e.g., weekly) imbalances between the current and future demand forecasts and supply positions. The demand conditioning system process assesses those weekly imbalances as either excess (i.e., over supply) or constrained (i.e., short supply). It further differentiates those imbalances as short-term (e.g., three weeks or less) or long-term (e.g., over three weeks), which drives unique activities within the three phases of the demand conditioning system. For example, short-term excess supply may be dealt with through an ad hoc sales activity where long-term excess supply position may be resolved through the supply liability reduction process, including formal promotions.

The demand conditioning system process proactively responds to demand and supply imbalances by using product, option, and component pricing, availability, and alternatives to influence customers to purchase products that are readily available and meet their business needs. The demand conditioning system process includes operational activities to mitigate the effects of imbalances, including determining the offerings' routes to market and interdisciplinary means to reduce the inventory liability. Examples of interdisciplinary means include brokering, vendor negotiations, squared sets analysis and build out (part of the optimization engine 104), option package development, promotions, incentives and commissions, special up-sell, alternative-sell, and down-sell activities. Each demand and supply imbalance is unique on the basis of scope, technology, product, market, etc., but the business process is repeatable and drives consistent outcomes of revenue growth, profitability and inventory liability minimization. The demand conditioning system includes process attributes, business scenarios, and metrics.

The demand conditioning system advances the demand planning, supply chain management, inventory and consultancy fields by identifying the components of an optimal demand conditioning process. The logical arrangement of sub-processes provides a coherent approach to demand and supply imbalances, development of tactical plans to mitigate imbalances, and a means to achieve optimal business conditions. The demand conditioning system process employs analytic techniques to achieve optimal demand conditioning that can be enhanced with appropriate automation tools.

Figure 1:
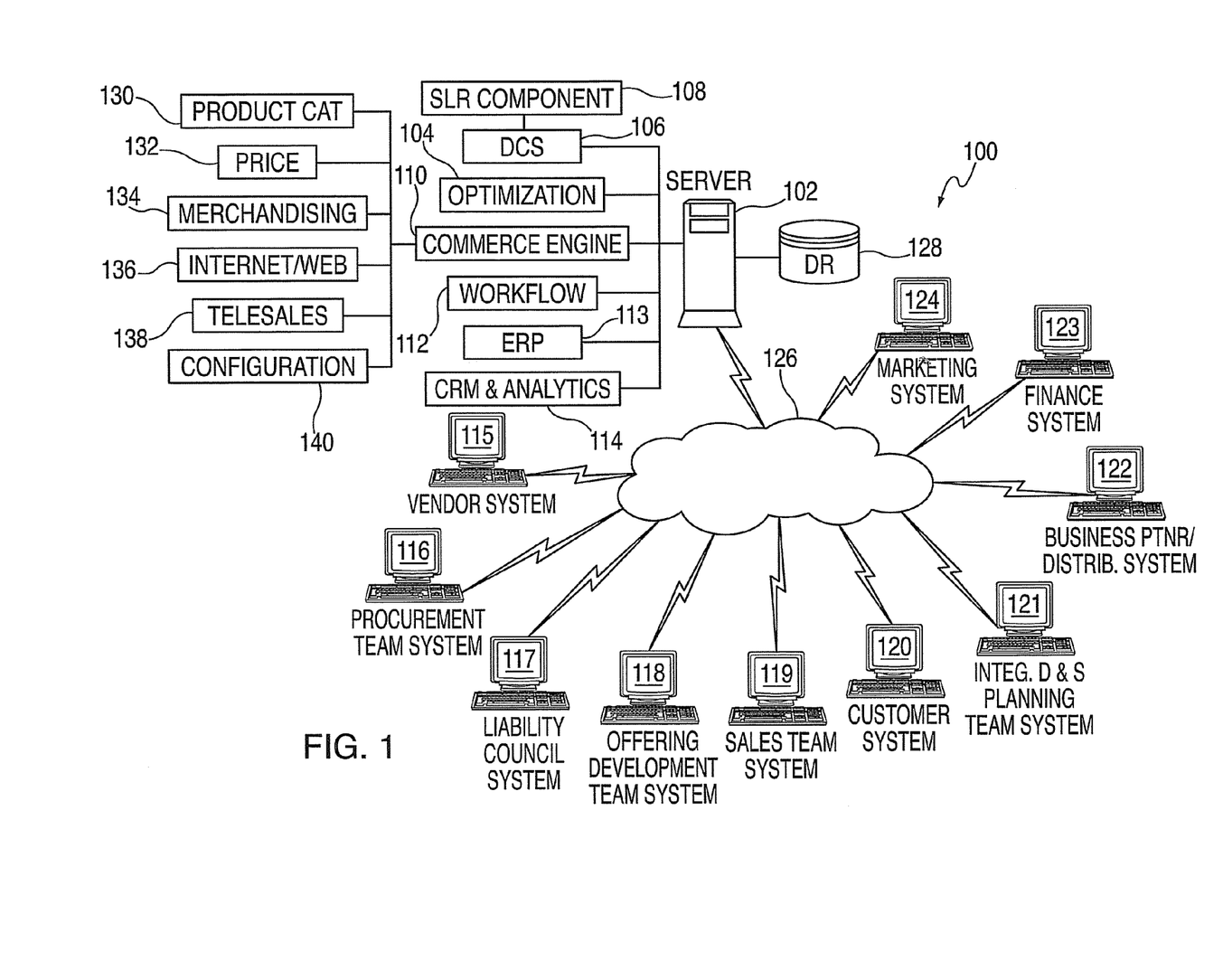
FIG. 1 is a block diagram illustrating a supply chain system upon which the demand conditioning system is implemented in an exemplary embodiment.

In terms of structure, reference is now made to FIG. 1. Therein depicted is a block diagram representing a network system 100 for implementing the demand conditioning system in one embodiment of the present invention. System 100 includes a host system or server 102 executing an optimization engine 104, the demand conditioning system 106 including a supply liability reduction component 108, a commerce engine 110, a workflow tool 112, an enterprise resource planning (ERP) tool 113, a customer relationship management (CRM) tool with analytics 114, and any other similar applications typically found in a supply chain environment. For purposes of illustration, the workflow component 112 utilized is IBM's Holosofx™ and the commerce engine 110 utilized is IBM's Websphere™ Commerce Business Edition. Commerce engine 110 performs a variety of functions and includes a product catalog 130, pricing component 132, a merchandising component 134, Internet/Web capabilities 136, a telesales component 138, and a configuration component 140. Commerce engine 110 receives customer orders and sends the data to ERP tool 113. Electronic commerce tools are generally used in e-business environments and will be understood by those skilled in the art. CRM tool 114 provides business intelligence to allow an enterprise to evaluate its customers by determining such factors as customer segments, preferences, purchasing history, etc.

Host system 102 is connected through a network 126 to client systems 115-124. Network 126 may comprise a LAN, a WAN, Internet or other network configuration known in the art. Further, network 126 may include wireless connections, radio based communications, telephony based communications, and other network-based communications. Secure Socket Layer (SSL encryption) software may be used to control access to host system 102, limiting permissions to network users, such as remote client systems and third party supplier or vendor systems, who have proper authorization.

Host system 102 may include an IBM® S/390 system or other suitable computer system. Host system 102 may execute web server software designed to accommodate various forms of communications, including voice, video, and text typically utilized by large business enterprises. Any web server software or similar program that handles general communications protocols and transport layer activities could be used as appropriate for the network protocol in use. For purposes of illustration, host system 102 is running Lotus Domino™ and Lotus Notes™ as its groupware applications software, however, any compatible e-mail-integrated, web-enabled collaborative software could be used.

Data repository 128 comprises any form of mass storage device configured to read and write database-type data maintained in a file store (e.g., a magnetic disk data storage device). Of course, it will be appreciated that data repository 128 may be one that consists of multiple disk subsystems which may be geographically dispersed and coupled via network architecture. There is no positive requirement that data repository 128 be maintained in one facility; to the contrary, the volume of information stored therein may dictate geographical dispersion and the like. Data repository 128 is logically addressable as a consolidated data source across a distributed environment such as network system 100. The implementation of local and wide-area database management systems to achieve the functionality of data repository 128 will be readily understood by those skilled in the art. Information stored in data repository 128 is retrieved and manipulated by a database manager and data mining software. For purposes of illustration, the database manager is utilizing IBM's DB/2® software.

Data repository 128 provides a repository for a library of documents and data that are created and utilized by the demand conditioning system, such as bills of materials (BOMs), available to promise statements (ATPs), sales plans/forecasts, business intelligence (analytics) and other data.

Client systems 115-124 comprise general purpose computer devices that allows systems 115-124 to connect to the network 126 and host system 102. Client systems 115-124 may access host 102 via internal web browsers located therein. Individual client systems 115-124 are described below. It will be understood that additional client systems may be utilized by the demand conditioning system and that the client systems 115-124 are representative of the types of client systems that may be found in system 100.

Individuals and teams involved in the business enterprise executing the demand conditioning system perform specific roles throughout the demand conditioning system process. They are also in communication with each other via client systems 115-124 as will be described further herein.

Vendor system 115 refers to a client system operated by external provider of components as well as business supplies used by the business enterprise. Procurement team system 116 refers to a client system operated by a procurement representative responsible for purchasing products for the business enterprise. Procurement team system 116 may trigger the initiation of the demand conditioning system when it is determined that there is significant material without demand (e.g., where there is little or no demand or potential sales for a product due to poor forecasting or other events). Liability council system 117 refers to a client system operated by a liability council member who performs various duties with respect to the demand conditioning system. For example, where the procurement team has indicated that there is material without demand, the liability council may look at the terms and conditions of the respective suppliers for these materials in order to determine the nature of the liability. The liability council then evaluates ways to mitigate that liability.

Offering development team system 118 develops, qualifies and manages the product structure throughout the entire product life cycle from conception to end-of-life.

Sales team system 119 refers to a client system operated by a sales/merchandising team member who is tasked with establishing purchasing incentives such as "buy-one-get-one-free", free shipping for certain products, promotional discounts, and similar plans.

Customer system 120 refers to a client system operated by a customer or prospective customer of the business enterprise where the customer inquires about purchasing or engages in the purchase of one or more end products from the business enterprise.

Integrated Demand and Supply Planning team system 121 refers to a client system operated by a member of the integrated demand and supply planning team. The integrated demand and supply planning team addresses imbalances in supply and forecasting activities by evaluating significant forecast inaccuracies and developing ways to mitigate them.

Business partner/distributor system 122 refers to a client system operated by a business partner or distributor of the business enterprise. A business partner is generally focused on entitled discounts. The business partner may buy in bulk from the business enterprise via a customized product catalog. A distributor typically sells products of the business enterprise under two-tier business framework. Business partners and distributors may be considered customers of the business enterprise as described above with respect to customer system 120.

Finance system 123 refers to a client system operated by a finance representative of the business enterprise. The finance team is responsible for setting prices on goods and provides the final vote on pricing matters, taking into account costs versus profitability and quality range levels. Updated pricing structures are accomplished via the pricing component 132 of commerce engine 110.

Marketing system 124 refers to a client system operated by a marketing representative of the business enterprise. The marketing group is involved with generating demand for a product which is then provided to the sales team. The marketing group also builds and maintains a hard copy of the product catalog and develops communications associated with products that are then provided to external advertisers.

The following definitions are supplied in reference to the components of the demand conditioning system.

End product. An end product refers to anything a customer purchases including finished goods and options.

Finished goods. Finished goods refer to completed goods for which at least one component is used to manufacture.

Options. Options refer to goods associated or related to the finished goods such that customers are likely to purchase them at the same time the desired finished goods are purchased. For example, options for a computer might include a printer, CD R/W drive, or other peripherals.

Excess component inventory liability. This refers to physical on-hand component inventory and/or contractual obligation to purchase components for the manufacture of finished goods which exceeds orders taken and forecasted demand. The liability threshold is calculated using on-hand supply and contractual obligations versus finished goods, end-of-life ramp down and demand forecast.

Constraint in supply capability. This refers to a short fall in on-hand component supply or component supply forecast, finished good or option that constrain the ability to supply an end product or option in quantities and timing defined by a demand forecast.

Figure 2:
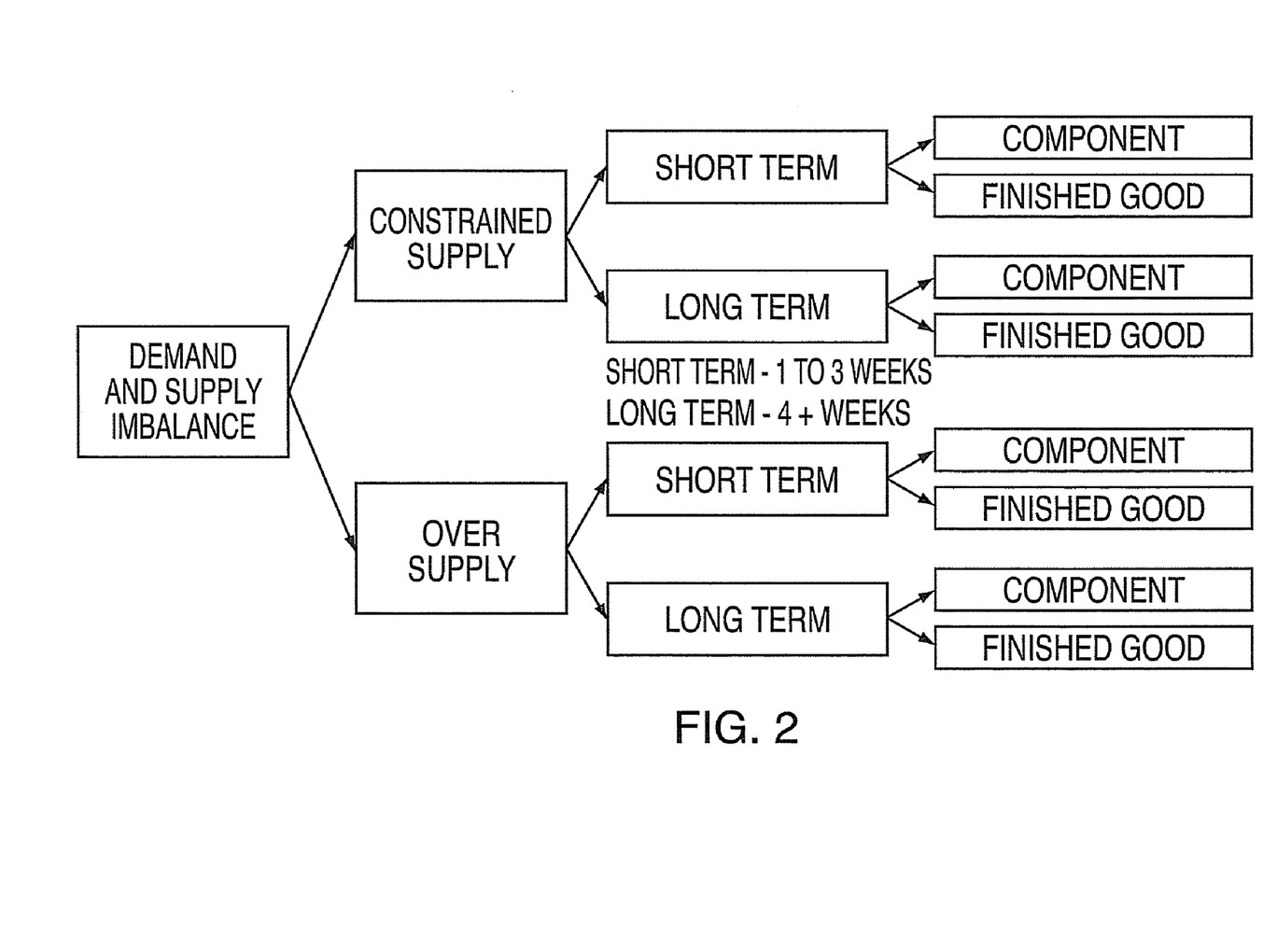
FIG. 2 is a diagram illustrating two supply imbalance scenarios that trigger implementation of the demand conditioning system in an exemplary embodiment.

The demand conditioning system process is initiated in response to one of two possible supply position scenarios: excess supply (e.g., more components or finished goods that can be consumed with current orders or projections within the demand forecast) and constrained supply (e.g., insufficient components to satisfy projected customer requirements). These two supply positions are further subdivided into time dimensions, either long-term (e.g., over three weeks) or short-term (e.g., three weeks or less). This distinction is used to differentiate the type of demand conditioning activities in the develop and execute phases of the demand conditioning system process. Another dimension of the supply position is finished goods and components as shown in FIG. 2. Production value-add converts components to finished goods or options. Production value-add refers to the application of time, money, people, energy, resources, etc., to raw materials or partially finished goods to make a whole. In most cases, there will not be a constraint on finished goods, rather a constraint on one or more components required for producing the finished good. Focus should be placed on the constraining component to resolve this issue. However, some occurrences, such as a catastrophic failure of a production facility, would constrain finished goods and normally have a direct impact on sales. In the constrained supply scenario, the demand conditioning system process would attempt to move or shift customers to a more readily available product.

Another aspect of the demand conditioning system considers how a seller of the finished goods interacts with the customer. For excess supply positions, the seller needs to generate demand via marketing and sales actions, such as promotions, marketing campaigns, reassessing routes to market, special bids, employee sales, revised commissions, price delegations and associated discounts, and aggressive and targeted telesales techniques. The technique selected depends on current market conditions and other environmental factors.

Additionally, in an excess supply position, close product alternatives (e.g., excess-supply products with similar function and price points) as well as correlated bundling opportunities (e.g., where customers typically buy products A and B together and A is in excess) can be used.

In a constrained supply position, a preferred approach is to move customers to another solution (e.g., combination of products, options, components or services) rather than booking the constrained order and waiting for the components. The value propositions of this technique are to reduce order management cycle times and costs, move current inventory, and minimize the risk of losing the sale.

Various merchandising techniques are utilized by the demand conditioning system. There are four general sales methods to address supply imbalances: cross-sell, up-sell, alternative-sell, and down-sell. When a customer is browsing or shopping for a solution the customer has expectation ranges for product capability, availability and price. These selling methods can be generally characterized by these expectation ranges as described below.

An up-sell opportunity is where a customer is sold a more richly configured solution (140) within the same product family above the customer's price range that satisfies the delivery date requirement. Incentives may be used to entice customers to agree to an up-sell.

A cross-sell opportunity provides complimentary products and services based on the products the customer has selected. Examples include shipping, warranty, accessories, and peripherals. Volume discounts may apply to cross-sell items.

An alternative-sell relates to a sale of a similar product to the customer that falls within the customer's price range and which satisfies the delivery date requirement.

A down-sell opportunity refers to a sale of a less capable alternative below the customer's price range and that satisfies the customer's delivery date requirement.

These techniques are used by the demand conditioning system to enhance customer satisfaction as well as generate the highest profit for the business. These goals can be realized by establishing an entry point product and providing products of increasing value to customers (i.e., up-sell), either through more capable products with an improved availability or through additional customer customization. Once a product is selected, the customer may identify complimentary options as part of the cross-sell merchandising techniques. Alternative-sell and down-sell opportunities are typically not as profitable and may be used as a last resort.

Figure 3:
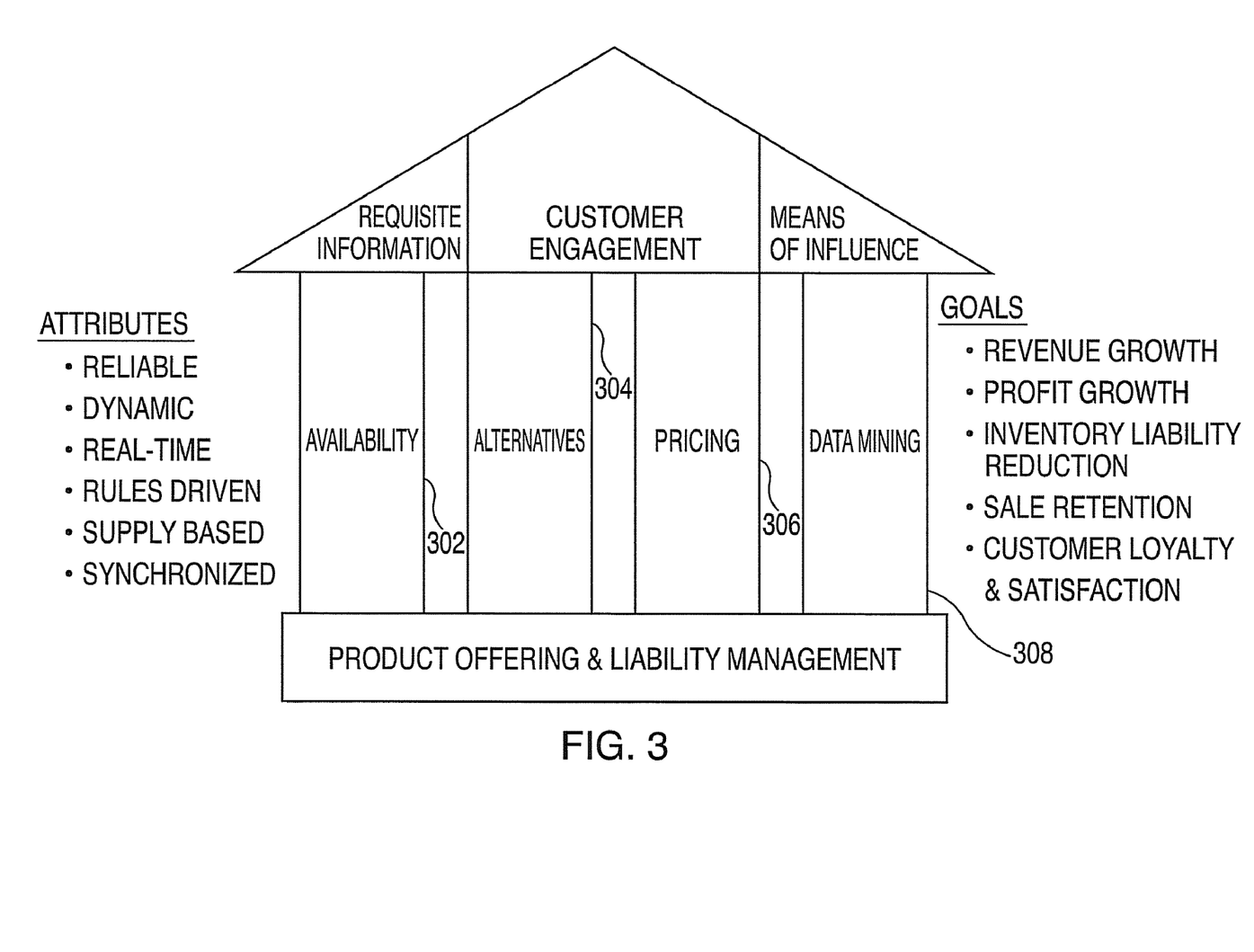
FIG. 3 is a diagram illustrating processes, attributes, and objectives associated with the demand conditioning system in an exemplary embodiment.

The demand conditioning system uses product and component availability, pricing, and product information to influence customers' buying behavior. These elements require an interdisciplinary approach as shown in FIG. 3 and involve participation from various departments of the business enterprise such as offering development 118, procurement 116, fulfillment, production, sales 119, marketing 124, distribution, and finance 123 teams. The sales department's responsibilities include: determining offering 'sweet spots', develop promotional campaigns in response to long-term over supply positions, withdraw advertising for constrained supply products, refresh the product catalog frequently, develop scripts for inbound and outbound telesales activities, assess incentives and commissions based on campaigns, and incorporate finished goods inventory at business partners as part of the complete inventory position.

The pricing function 306 should permit automatic, rules-based delegated and promotional pricing based on marketplace demand, value perishability, and supply position. Each customer segment should have a pricing range established and refreshed based on a set of policies and business rules. The pricing must be synchronized across all routes to market to ensure one unified front is presented to the customer, regardless of the route the customer chooses to purchase the product. This results in improved customer satisfaction and channel harmony. If the customer has a unique contract with the seller, then the customer's entitled price should be displayed along with the associated volume discounts. The pricing methodology should be sufficiently flexible to deliver either profit or revenue maximization based on the given supply situation. The finance team 123 adjusts the price system 132 accordingly.

The product, option, and component product structure of the 'alternatives function' 304 should be listed in product association tables and updated on a daily basis. Product association tables provide suitable solutions i.e., a specific laptop with a printer and cable. For example, not all printers or cables work with specific laptops. Therefore, the tables provide a trusted source of data that ensures the customer selection will function as a complete solution. The product association tables are jointly developed and managed by the offering 118 and marketing 124 teams, and are maintained in the product catalog 130.

Product releases should specify qualified and comparable products, options and components. The product structure should be categorized by price range, functional equivalence and availability to facilitate codification into cross-sell, up-sell, alternative-sell, or down-sell opportunities. Similar products with a longer lead time availability than the originally selected product should not be shown to the customer or sales representative.

The availability data 302 should be provided by a single trusted data source for credible information, normally the scheduling application of ERP component 113. The data should be refreshed in real-time to permit a dynamic demand conditioning process. The availability function 302 should be capable of translating a supply-based available-to-promise (ATP) statement (e.g., a quantity capable of being produced) into an availability lead time of the number of days to delivery. Transit information should be calculated based on source of supply and destination. As the customer is configuring their solution, pricing and availability information should be displayed in the configurator 140 of commerce engine 110 and prior to order submission. The configurator 140 provides the customer the opportunity to customize a solution to their unique specifications. For example, on a desktop computer, you can select the speed of the processor, the size of the hard disk (20 GB, 30 GB, 40 GB, etc.), software, operating system, etc., can be selected.

The data mining component 308 is performed by CRM and analytics component 114 and provides business insight into the effectiveness of merchandising campaigns, product history (suggestive up-selling based on most popular products), customer and segment analytics (ensuring that the business enterprise knows who the customer is and the industry they participate in). Data mining linked with statistical models will provide reactive information for inbound TeleSales calls and proactive, targeted and integrated marketing communications via outbound TeleSales calls and e-mails.

The demand conditioning system process incorporates a continuum of techniques to mitigate demand and supply imbalances. Each of these techniques, in turn, helps to reduce inventory liability by making adjustments to other business processes and create attractive offers for the customer. The demand conditioning system process minimizes inventory write-off to an acceptable financial level, identifies products and components not susceptible to further demand conditioning activities, and maximizes demand conditioning activities on products and options that have sales potential and generate profitability.

Figure 4:
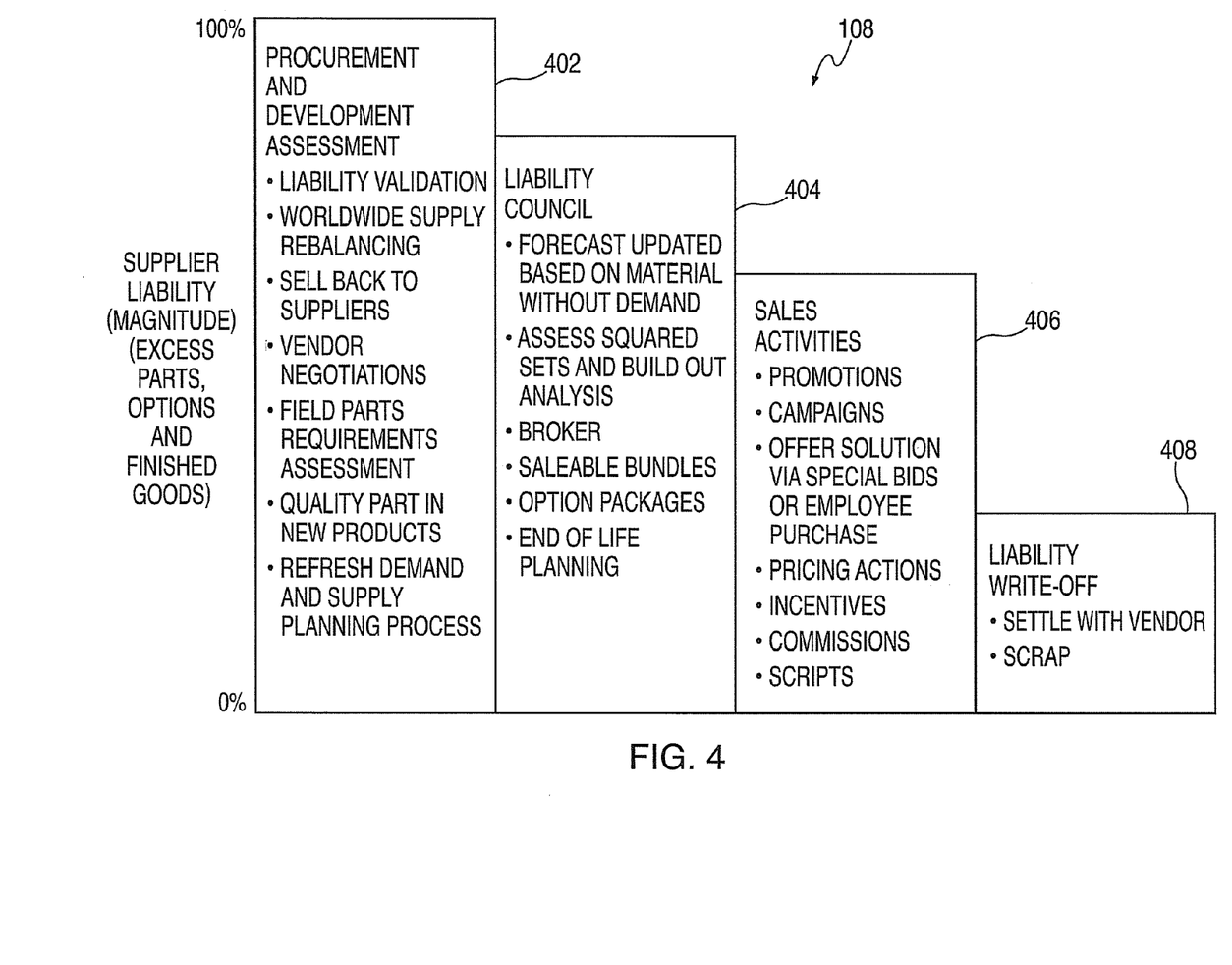
FIG. 4 is a diagram of the supply liability reduction component of the demand conditioning system in an exemplary embodiment.

The supply liability reduction component 108 of the demand conditioning system provides a time-phased approach to reducing supply liability as shown in FIG. 4. The sub-processes 402-408 begin at a 100 percent liability assessment and, through a series of mitigation activities, seek to reduce the liability to an acceptable financial level. FIG. 4 depicts the relationships with the vertical axis representing the magnitude of the liability and the horizontal axis generally reflecting the mitigation efforts over time.

The procurement and development assessment sub-process 402 involves conducting a cross functional assessment by the offering development team 118 and procurement supply assessment team (herein referred to as "procurement team" 116). The procurement team validates the scope and duration of the liability and takes the one or more of the actions described below.

Rebalance demand and supply on a worldwide basis. For example, the imbalance in one geography could be alleviated by shifting demand or supply from another geography.

Sell components back to vendors. If the technology of the component has not aged, it may be suitable for another customer.

Negotiate with the vendor to eliminate or reduce the liability based on mutually agreed to incentives. The technology of the component may have lost some of its value with aging and does not command the original supplier price. The negotiations should provide some incremental value to both parties.

Assess whether the components could be used for field parts in support of the warranty program or servicing requirements.

Qualify the components in new products.

Recommend adjustments to the sales forecast in the demand and supply planning process. For example, a constraint may be addressed by adjusting the demand statement.

Forward recommendations for issues that could not be resolved to the Liability Council. This action initiates execution of sub-process 404, that is, liability council 117 assessment.

The liability council assessment sub-process 404 receives the unresolved development and procurement assessment issues. The liability council 117 is a cross-functional team and comprises representatives from procurement 116, finance 123, offering (development) 118, sales 119, integrated demand supply planning 121, manufacturing, and supply chain teams. The council develops solutions and preventative measures concerning inventory liability issues and oversees end-of-production transition from development and manufacturing to the warranty and service phase of the product life cycle. The council meets periodically, (preferably weekly at a minimum) and takes one or more of the actions described below.

Update the forecast based on material without demand or a constrained supply position.

Conduct squared sets analysis (e.g., bill of material explosion and product implosion).

Broker the components or products that are no longer saleable through the business' sales team.

Create saleable bundles with other current offerings.

Develop option packages that are attractive with other products.

Recommend alternative routes to market to the sales team.

Make recommendations to the liability write-off team, which is comprised of finance team members, for products, options, and components not suitable for additional demand conditioning actions. Conduct end-of-life planning and product transitions.

Forward recommendations for sales actions to the demand conditioning meeting. This action initiates execution of sub-process 406; that is, sales activities.

The sales activities sub-process 406 comprises a set of sales activities undertaken by the finance 123, marketing 124, sales 119, and distribution teams. This group is responsible for engaging the customer 120 through various channels 122 and means. The team takes one or more the actions described below.

Develop a promotion for long-term overages through advertisements and other communications media.

Offer the solution via other routes to market, such as secondary channels, brokers, special bids, or employee sales. Data mining 114 may be used to provide focused results and achieve the desired impact.

Authorize pricing actions, including price decreases, discount incentives, and pricing delegations.

Establish incentives for buying or selling.

Reassess the commission structure for the offering.

Update telesales team scripts 138 for inbound and outbound telephone calls.

Request the liability council address specific issues that cannot be resolved via sales activities.

The liability write-off sub-process 408 is conducted by a team including representatives from finance 123, manufacturing, and inventory management based on a recommendation from the liability council 117. The remaining inventory liability is handled through a financial transaction with the vendor or is scrapped. The scope and timing of these actions are determined by the finance team based on accounting principles and financial objectives such as an expense to revenue target based on industry benchmarks or corporate goals.

The demand conditioning system process is a proactive, self-correcting process for resolving demand and supply imbalances. The demand conditioning system process is described in FIG. 5. The activities for the plan phase occur at steps 501 through 508 and 526-528 as part of the closed loop process. The activities for the develop phase occur in steps 509-513. The activities described in the execute phase occur in steps 514-525.

Figure 5:
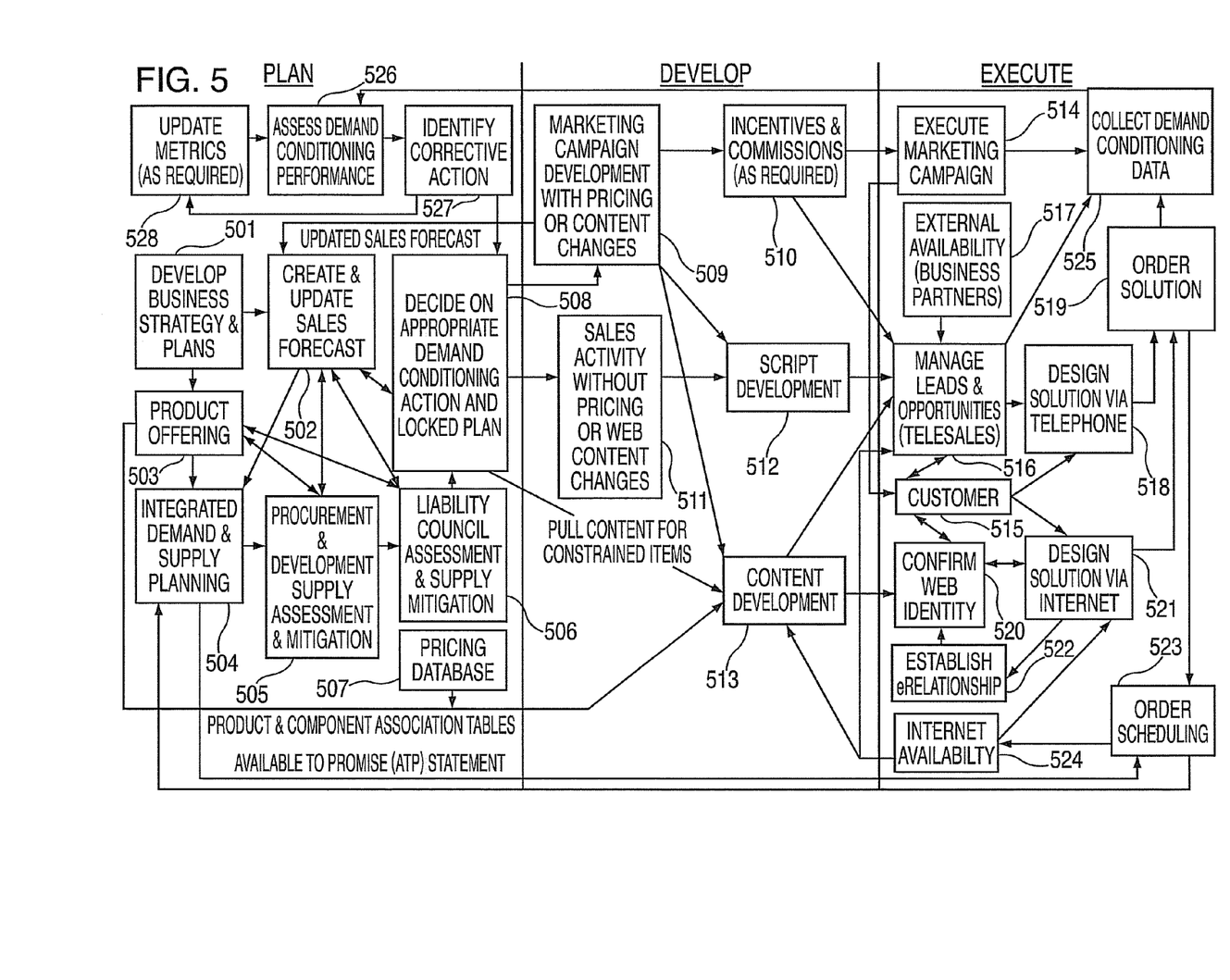
FIG. 5 is flowchart describing the process of executing the demand conditioning system in an exemplary embodiment.

In the plan phase, a business strategy and plan is developed at step 501 by business strategists, finance 123, and marketing 124 team members. This step involves creating a business model, value proposition, market analysis, and other business plans.

This information from step 501 creates a sales forecast at step 502 via representatives from finance 123, marketing 124, sales 119 and integrated demand and supply planning 121 teams. The sales forecast is entered into the ERP 113 system via an optimization application 104. The worldwide sales forecast may be subdivided by geography and channel (e.g., route to market). Creating the sales forecast includes developing planning cycle parameters, assessing supplier responses, conducting end-of-life planning, and identifying excess products/options, constrained components, risks, and alternatives. During the demand conditioning process, the sales forecast may be updated at step 502 as will be described further herein. These forecast updates are the result of proposed sales activities conducted by the marketing team (from step 509). The sales forecast is created and updated through interactions with other sub-processes such as SLR component 402 (step 505), SLR component 404 (step 506), and results of demand conditioning meetings (step 508). The sales forecast information is provided to the integrated demand and supply planning team. The sales forecast may be updated upon receiving corrective actions at step 527. These corrective actions result from the collection and assessment of demand conditioning data and performance for demand conditioning system processes previously executed (steps 525 and 526).

In addition to providing the business strategy plan information to the sales forecast team, it is also provided to the product offering team where product offering development activities occur at step 503. The outcome of this step is the development of the product structure and the creation of the product, option and component product matrices. The product structure is provided to the integrated demand and supply planning 121 team and procurement 116 team, and product association tables are merged with pricing information and provided to the sales 119 team and content development component for presentation to customers 120 or business partners 122 upon request. The pricing information includes portfolio, entitled, and delegated pricing information. The product offering team interacts with the liability council 117 to qualify components and develop option packages, as well as certify and manage product life cycles.

An integrated demand and supply planning sub-process occurs at step 504 where the integrated demand and supply planning 121 team receives the product structure from the product offering 118 team and receives the sales forecast from the sales forecast team. The integrated demand and supply planning process explodes the BOM based upon the sales forecast as well as current demand data received from the scheduling component, supplier commitment to the supply request, and implosion into saleable products resulting in an available to promise (ATP) statement for each product and component. The ATP statement embodied in ERP 113 is translated into lead times for delivery and then sent to the scheduling component. This information is also sent to the SLR procurement and development assessment process 402.

At step 505, the SLR procurement and development assessment sub-process 402 is performed by procurement 116 team members and offering development 118 team members using supply information received from the integrated demand and supply planning 121 team. Any unresolved supply liability is provided to the liability council 117 and is referred to as material without demand data. This procurement and development assessment sub-process 402 interacts with the product offering team and sales forecast team. Sub-process 402 is described further in FIG. 4.

At step 506, a SLR liability council assessment 404 is conducted by the liability council 117 comprised of procurement 116, finance 123, offering development 118, sales 119, integrated demand and supply planning 121, manufacturing, and supply chain personnel. This process receives supply liability information from the procurement team and provides recommendations to the demand conditioning meeting. Any liability write-off recommendations 408 may be determined in step 506. This process also interacts with the offering development team 118 and sales forecast team. The sales forecast team updates the sales forecast based on the material without demand data. As indicated above with respect to step 503, the liability council 117 interacts with the offering development team 118 to qualify components, develop option packages, and certify and manage product life cycles. The liability council assessment process 404 is described further in FIG. 4.

At step 508, a demand conditioning meeting is conducted. The weekly meeting preferably comprises an interdisciplinary team comprised of offering development 118, finance 123, procurement 116, sales 119, marketing 124, fulfillment, supply chain, telesales, web content management, operations, and manufacturing. The team members identify demand conditioning opportunities and recommend an updated sales plan to address the demand and supply imbalances based upon the results of the liability council assessment 404. The members of the demand conditioning meeting interact with the sales forecast team and provides sales, marketing, and distribution direction to the sales activity team based upon the current and future over supply or constrained supply positions. For example, for long-term overages that qualify for a promotion, the marketing team will receive appropriate direction. Ad hoc sales actions are directed through step 511. In the event that a product or option is constrained, the content may be pulled from the Web.

At step 509 sales activities are developed by members from the marketing 124 team, sales 119 team, finance 123, and distribution. A marketing campaign or sales promotion 134 is developed by the marketing team and may include electronic and non-electronic media with specific product content and special pricing. The marketing team creates the offering, identifies the target audience and determines the media channels to be employed. Timing and target audience analysis drives media options to create favorable marketing impression, and identifies the frequency and duration of the campaign. Additionally, formal marketing campaigns establish brand image, technological and price leadership, and activate customer interest in the solutions proffered. Formal marketing campaigns move long term excess supply, and establish customer interest in entry products suitable for cross-sell and up-sell opportunities. The entire promotional package requires that the sales forecast be updated via a feedback loop to step 502.

At step 510, an incentives and commissions plan which is created from step 509 is reassessed to ensure the promotion's success. The input from the marketing team 124 is utilized for executing the marketing campaign. Purchasing behavior is measured in relation to various incentives. Based on historical precedent, the incentives and commissions required to support a specific promotion is calculated and their use authorized. The incentive and commission information is passed to the telesales teams to motivate the desired selling activity.

At step 511, sales activities are identified that do not require a formal marketing campaign, web content changes, or pricing action. The sales activity is translated into a simple script that the telesales team can use.

A script for the telesales team is developed at step 512. Regardless of the marketing campaign or sales activity, the information is translated into a usable script for the telesales team to manage leads and opportunities. Scripts 138 include promotional timing information, marketing segments, profitability targets, method of customer contact, and explicitly lay out the details of the promotion and verbiage to be used by the telesales team. The scripts identify the products suitable for up-sell, normally logical transitions from a base or entry configuration, with key recommendations that create value in the customer's mind. Below the products alternatives on the script, several cross-sell opportunities are suggested that complete the order.

At step 513, content on the Internet or Web 136 is developed or removed. The product structure information 130 provided by the product offering team 118 is merged with pricing information 132 and internal availability from ERP 113 into commerce engine 110. Constrained supply is identified in the weekly demand conditioning meeting, and a recommendation is made to pull the product or option from the web. A specific marketing campaign's information to move excess supply will be pushed onto the Web. The Web content will be made available to the telesales team and Internet portal for business partners 122 and registered customers 120.

At step 514, the customer 120 or business partner 122 who is influenced by a marketing campaign makes interactive inquiries through the telesales team or the Web 136 and designs solutions via the telephone or Web. Many customers may be browsing the Web to obtain key product, price and availability information. The information will assist customers in formulating a buy decision or follow a prompt to call the telesales team.

At step 516, the sales leads and opportunities are managed by the telesales team. Various information inputs are presented to the telesales team from the incentives and commissions plan, scripts from telesales component 138, web content 136, external availability provided by vendor system 115, and internal availability provided by ERP 113. This allows the telesales team to interactively communicate with the customer to design a solution for the customer. The telesales team will aggressively employ the predefined scripts to facilitate up-sell and cross-sell opportunities. In some cases through data mining conducted by CRM component 114, select products are targeted toward specific customer sets through outbound telephone calls (enhanced penetration). The telesales team tracks manages, and closes opportunities.

Availability information for products, options and components held by business partners 122 is provided to the telesales team to assist in closing sales or fulfilling back orders through buy back techniques. The company may sell a product or option to a distributor or business partner at client system 122. In the event the business enterprise is out of stock of a specific product, it may query its distributors and business partners for the requested item, and repurchase it.

At step 518, solutions (e.g., combination of products, options, components and services) are designed over the telephone between the customer and telesales team, where an opportunity is converted to an order. The telesales team identifies cross-sell and up-sell opportunities based on scripts and availability considerations. A price is quoted to the customer, with the associated contractual agreement and disclaimers, before securing customer approval over the telephone.

Input from the telesales team at step 518 or Internet 521 are received at step 519 and the solution is sent to scheduling at step 523. Orders that pertain to demand conditioning activities may include associated promotion or sales codes or keys entered during the ordering process to permit the collecting of sales data at step 525. The sales order is built and completed, with appropriate administration and configuration validations.

At step 520, a customer 120, 122 goes directly to the Internet to order a product based on prior product knowledge and customer registration (522). The customer keys in a unique identifier code to commence and streamline the ordering process (521-523). Upon confirming the customer's identity, the customer profile, personalization, and entitlements are displayed to the customer. The web site preferably includes traffic reporting and behavior analysis capabilities to obtain insight into customer activities that may be indicators of conversion success for a specific promotion.

At step 521, customers may design a solution after they have identified themselves as part of the browse shop and buy experience. Prior to ordering, the customer can continue the business relationship by requesting a unique identifier code from the business enterprise. The web site configurator 140 identifies cross-sell and up-sell opportunities based on historical buying patterns, current configuration, shopping cart, or availability considerations. The customer will be presented with these opportunities, either automatically based on current sales actions, or through a selection by the customer. A price is displayed to the customer, with the associated contractual agreement and qualifiers before the customer submits the shopping cart to the seller.

At step 522, an Internet relationship is established between the customer and the company. The customer provides critical information as to their identity and the business enterprise provides a unique identifier code that may be reused on a recurring basis by the customer without rekeying order data. Registration allows for web customer analysis by CRM component 114 which provides a complete view of the customer's interactions. Data mining permits targeted, proactive merchandising to customers based on their purchase patterns or web browsing history.

At step 523, the scheduling component receives an ATP statement from ERP 113 on a period basis and provides an updated demand statement in return. As orders are booked, the order scheduling component decrements the availability of products, options, and components in near real time.

The periodic ATP statements and real-time decrements are sent to content development, the Internet, and the telesales team at step 524.

Order data and associated promotion codes are collected by the marketing campaign, sales leads, and ordering process step 525 and are used to identify customer buying patterns. This information is fed back to the plan phase to ensure a closed-loop process. Additionally, data mining 114 identifies potential opportunities for outbound telesales calls or prompts to the customer during their web shopping experience.

At step 526, the sales data relating to the demand conditioning activities are assessed. If the performance is not satisfactory, then corrective actions are required at step 527. The assessment includes the reviews of the quality and analysis of the data as part of the feedback. The data reports should be compared to the key metrics. Trends, either up or down, in conjunction with other analytics, will provide insight into demand conditioning performance. Data mining is a critical part of the performance assessment sub-process. Data mining 114 provides recommendations for pursuing option cross-selling to large enterprise accounts, outbound telesales activities, moving solutions to other channels, and insight into the effectiveness of select telesales actions.

At step 527 appropriate corrective actions are identified based on the assessment conducted in step 526. As necessary, demand conditioning metrics are updated at step 528 for the assessment phase. Recommendations are identified and submitted to the demand conditioning meeting to adjust appropriate plans and activities.

Demand conditioning metrics are updated at step 528. The metrics are used to evaluate the business process. Recommended metrics for the optimal demand conditioning process may include the following items listed below.

Oversupply position
  Supply, No Orders
  Revenue due to operational sales activity
  Profit due to operational sales activity
  Quantity of surplus supply consumed
  Percentage of surplus supply consumed
 Constrained Supply Position
  Orders, No Supply
  Revenue for alternative orders
  Profit for alternative orders As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A storage medium comprising machine-readable computer program code for resolving demand and supply imbalances, the storage medium including instructions embodied thereon, which when executed by a computer cause the computer to implement a method, the method comprising:
 identifying at least one of excess component inventory liability and constraint in supply capability for an end product by matching current buying patterns for the end product against inventory liability and supply capability based on a previous demand forecast;
 reducing supply liability for the at least one of excess component inventory liability and the constraint in supply capability for an end product using a time-phased approach that begins at 100 percent liability assessment and includes a series of mitigation activities performed over time until the supply liability reaches a specified percentage level, the time-phased approach including a procurement and development assessment sub-process, a liability council assessment sub-process, a sales activities sub-process, and a liability write off sub-process, the time-phased approach implementing:

where the excess component inventory liability exists:
  refocusing the excess component inventory liability by determining alternative end products that use components identified in the excess component inventory liability; and
  executing sales activities operable for enticing sales of the alternative end products; and
where the constrained supply capability exists:
  determining alternative end products that are functionally equivalent to those identified in the constrained supply capability; and
  executing sales activities operable for enticing sales of functionally equivalent alternative end products;
  wherein the sales activities result in one of: reducing the excess component inventory liability and avoiding the constraint in supply capability.

2. The storage medium of claim 1, wherein the identifying the at least one of the excess component inventory liability and the constraint in supply capability includes:
  exploding a bill of materials for a product structure based upon a sales forecast, demand data, and supplier commitment data;
  imploding results of the exploding into end products and an available to promise statement;
  translating the results into lead times for delivery; and
  identifying remaining results not included in the available to promise statement as one of the excess component inventory liability and the constraint in supply capability for an end product.

3. The storage medium of claim 1, wherein the refocusing the excess component inventory liability by determining alternative end products that use components identified in the excess component inventory liability includes performing a supply liability reduction process comprising:
  a procurement and development assessment sub-process including mitigation activities, the procurement and development assessment sub-process mitigation activities representing a greatest magnitude of liability;
    wherein the procurement and development sub-process mitigation activities are performed first in time before other sub-processes.

4. The storage medium of claim 3, wherein the performing a supply liability reduction process further includes:
  performing a liability council assessment sub-process including mitigation activities, the liability council assessment sub-process mitigation activities representing a magnitude of liability less than that of the procurement and development assessment sub-process;
    wherein the liability council assessment sub-process mitigation activities are performed second in time after the procurement and development assessment sub-process.

5. The storage medium of claim 3, wherein the performing a supply liability reduction process further includes:
  performing a sales activities sub-process including mitigation activities, the sales activities sub-process mitigation activities representing a magnitude of liability less than that of the liability council assessment sub-process;
    wherein the sales activities sub-process mitigation activities are performed third in time after the liability council assessment sub-process.

6. The storage medium of claim 3, wherein the performing a supply liability reduction process further includes:
  performing a liability write off sub-process including mitigation activities, the liability write off sub-process mitigation activities representing a magnitude of liability less than that of the sales activities;
    wherein the liability write off sub-process mitigation activities are performed fourth in time after the sales activities sub-process.

7. The storage medium of claim 3, wherein the procurement and development assessment sub-process mitigation activities comprise at least one of:
  rebalancing demand and supply by shifting one of demand and supply from one geography to another;
  selling components back to vendors;
  using excess components as field parts in support of a warranty program;
  qualifying excess components in new products; and
  adjusting the sales forecast to account for one of the excess and constrained components.

8. The storage medium of claim 4, wherein the liability council assessment mitigation activities comprise at least one of:
  updating the sales forecast to account for one of the excess and constrained components;
  conducting squared sets analysis;
  brokering components and products that are no longer saleable;
  creating saleable bundles with other current offerings;
  developing option packages;
  determining alternative routes to market; and
  making liability write-off determinations.

9. The storage medium of claim 5, wherein the sales activities sub-process mitigation activities sub-process comprise at least one of:
  developing a promotion for long-term over supply through advertisements and communications media;
  offering a solution via alternate routes to market;
  authorizing pricing actions comprising at least one of:
    price decreases;
    discount incentives; and
    pricing delegations;
  establishing incentives for buying and selling;
  reassessing commission structures for an offering; and
  updating telesales team scripts for inbound and outbound telephone calls.

10. The storage medium of claim 6, wherein the liability write off mitigation activities comprise at least one of:
  negotiating with a vendor; and
  scrapping components associated with the liability.

11. The storage medium of claim 3, wherein the sales activities include:
  cross-sell;
  up-sell;
  alternative-sell; and
  down-sell.

* * * * *